United States Patent
Boyle

(10) Patent No.: US 10,445,236 B2
(45) Date of Patent: Oct. 15, 2019

(54) METHOD TO CONSISTENTLY STORE LARGE AMOUNTS OF DATA AT VERY HIGH SPEED IN PERSISTENT MEMORY SYSTEMS

(71) Applicant: Futurewei Technologies, Inc., Plano, TX (US)

(72) Inventor: Thomas Boyle, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 246 days.

(21) Appl. No.: 15/350,428

(22) Filed: Nov. 14, 2016

(65) Prior Publication Data

US 2018/0137052 A1    May 17, 2018

(51) Int. Cl.
| | |
|---|---|
| G06F 12/00 | (2006.01) |
| G06F 12/0804 | (2016.01) |
| G06F 12/0811 | (2016.01) |
| G06F 12/084 | (2016.01) |
| G06F 12/0842 | (2016.01) |
| G06F 12/0875 | (2016.01) |
| G06F 12/0897 | (2016.01) |

(52) U.S. Cl.
CPC ........ G06F 12/0804 (2013.01); G06F 12/084 (2013.01); G06F 12/0811 (2013.01); G06F 12/0842 (2013.01); G06F 12/0875 (2013.01); G06F 12/0897 (2013.01); *G06F 2212/1016* (2013.01); *G06F 2212/202* (2013.01); *G06F 2212/452* (2013.01)

(58) Field of Classification Search
None
See application file for complete search history.

(56) References Cited

U.S. PATENT DOCUMENTS

| | | | |
|---|---|---|---|
| 2013/0086330 A1 | 4/2013 | Baddepudi et al. | |
| 2015/0032972 A1 | 1/2015 | Sakthivelu et al. | |
| 2015/0261461 A1 | 9/2015 | Li et al. | |
| 2015/0261674 A1* | 9/2015 | Wei | G06F 12/0866 711/135 |
| 2017/0357583 A1* | 12/2017 | Boyer | G06F 12/0804 |
| 2018/0060231 A1* | 3/2018 | Kelly | G06F 11/1441 |

FOREIGN PATENT DOCUMENTS

| | | |
|---|---|---|
| CN | 103917963 A | 7/2014 |
| CN | 105339908 A | 2/2016 |

OTHER PUBLICATIONS

"International Application Serial No. PCT/CN2017/110182, International Search Report dated Feb. 7, 2018", 4 pgs.
"International Application Serial No. PCT/CN2017/110182, Written Opinion dated Feb. 7, 2018", 4 pgs.

* cited by examiner

*Primary Examiner* — Midys Rojas
(74) *Attorney, Agent, or Firm* — Schwegman Lundberg & Woessner, P.A.

(57) ABSTRACT

A thread on a processor core executes one or more instructions to write file data for a file into a persistent memory save area. The instructions to write the file data have the effect of storing the file data for the file in the cache associated with the processor core. The thread running on the processor core flushes the file data from the cache to the persistent memory save area while retaining the file data in the cache. The thread running on the processor core copies the file data from the cache for the processor core into a persistent copy of the file that is stored in persistent memory.

20 Claims, 8 Drawing Sheets

METHOD TO CONSISTENTLY STORE LARGE AMOUNTS OF DATA AT VERY HIGH SPEED IN PERSISTENT MEMORY SYSTEMS

FIELD OF THE INVENTION

The present disclosure is related to transfer of data to memory storage and, in particular, to storing or updating large amounts of data at very high speed in persistent memory.

BACKGROUND

Some file systems use a data journal to preserve consistency of data. When data is to be written to a file, it is first saved in a high speed persistent storage medium (e.g., a hard disk) for the data journal along with the position and size in the original file where the data will be saved. The journal entry is then saved to persistent storage (e.g., a hard disk drive). At this point, the file write can be recovered from the journal entry on the persistent storage in the event of an interruption such as a power failure. Accordingly, applications relying on the data having been written can proceed once the journal entry is added to the persistent storage. The actual copying of the data to the file may proceed under the control of the persistent storage. For example, writes may be reordered based on a cylinder seek position or a location of a rotational disk head. Similarly, processes for copying the data from the data journal to the file may operate asynchronously and in parallel. In this context, maintaining data consistency refers to ensuring that after a system crash or power failure, attributes and data of a file are either the values they had prior to the write or the values after a successful write. Inconsistent data would have a mix of the two, or even be corrupted with other values.

For writes of sufficiently small amounts of data, the operation may automatically be atomic (i.e., indivisible). An example of this is when the data size is equal to the size of a central processing unit (CPU) cache line (e.g., 64 bytes for an Intel© x86 processor with support for transactional state extensions (TSX)). Thus, when an instruction to write 64 bytes to a file are executed, the write will either be successful and the file will be updated or, in the event of power failure, the write will fail and the file will remain unchanged.

In a Zettabyte File System (ZFS), blocks are written atomically by writing a replacement page to persistent storage and then updating a pointer in the file system from the original page to the replacement page. Since the pointer (e.g., a 64-bit pointer) is written in a single operation, in the event of an interruption, the file either contains the original page or the replacement page, but never contains a corrupted, mixed page.

SUMMARY

A method includes writing, by a primary thread running on a processor core, file data for a file into a persistent memory save area; flushing, by the primary thread running on the processor core, the file data from a data cache for the processor core to memory while retaining the file data in the data cache; and copying, by the primary thread running on the processor core, the file data from the data cache for the processor core into a persistent copy of the file that is stored in persistent memory.

A device includes a non-transitory memory storage comprising instructions and a processor core in communications with the memory storage. The processor core executes the instructions to write, by a primary thread running on the processor core, file data for a file into a persistent memory save area; flush the file data from a data cache for the processor core to memory while retaining the file data in the data cache; and copy the file data from the data cache for the processor core into a persistent copy of the file that is stored in persistent memory.

Described is a non-transitory computer-readable media storing computer instructions, that when executed by a processor core, cause the processor core to perform the steps of writing, by a primary thread running on the processor core, file data for a file into a persistent memory save area; flushing the file data from a data cache for the processor core to memory while retaining the file data in the data cache; and copying the file data from the data cache for the processor core into a persistent copy of the file that is stored in persistent memory.

In example 1, a device comprises: a non-transitory memory storage comprising one or more instructions; a persistent memory that stores a file; a processor core in communication with the non-transitory memory storage and the persistent memory; and a cache associated with the processor core; wherein a thread running on the processor core is configured by the one or more instructions to perform operations comprising: storing file data for a file in the cache associated with the processor core; flushing the file data from the cache for the processor core to a persistent memory save area while retaining the file data in the cache; and copying the file data from the cache for the processor core into a persistent copy of the file that is stored in the persistent memory.

In example 2, a device comprises the device of example 1, wherein: the storing of the file data for the file in the cache associated with the processor core is an effect of performing an operation to write the file data for the file into the persistent memory save area; and the operations further comprise: prior to the performing of the operation to write the file data for the file into the persistent memory save area, preventing interrupts and other threads from running on the processor core, so that only the thread runs on the processor core.

In example 3, a device comprises the device of example 2, wherein the operations further comprise: after copying the file data into the persistent copy of the file, restoring the ability of interrupts and other threads to run on the processor core.

In example 4, a device comprises the device of any of examples 1 to 3, wherein the operations further comprise: after copying the file data into the persistent copy of the file, removing the file data from the cache associated with the processor core.

In example 5, a device comprises the device of any of examples 1 to 4, wherein the cache associated with the processor core is a memory buffer.

In example 6, a device comprises the device of any of examples 1 to 5, wherein: the cache associated with the processor core is a level 1 (L1) cache; and the operations further comprise: flushing, by the thread running on the processor core, additional file data from an L2 cache to memory while retaining the file data in the L2 cache; and copying, by the thread running on the processor core, the file data from the L2 cache into a persistent copy of the file that is stored in persistent memory.

In example 7, a device comprises the device of any of examples 1 to 6, wherein the flushing of the file data from a data cache for the processor core to memory while retaining the file data in the data cache includes a peripheral component interconnect express (PCI-E) device snooping the file data from the data cache for the processor core.

In example 8, a device comprises the device of any of examples 1 to 7, wherein the persistent memory is a storage class memory (SCM).

In example 9, a device comprises the device of any of examples 1 to 7, wherein the persistent memory is a non-volatile dual in-line memory module (NVDIMM).

In example 10, a device comprises the device of any of examples 1 to 9, wherein the operations further comprise: locking one or more instructions to perform the storing, flushing, and copying operations into an instruction cache for the processor core.

In example 11, a device comprises the device of any of examples 1 to 10, further comprising: a power backup coupled to the processor core; and wherein the operations further comprise: detecting a failure of primary power for the processor core; and saving content from the cache associated with the processor core in response to the detected failure of primary power.

In example 12, a device comprises the device of any of examples 1 to 11, wherein: the processor core is one of a plurality of processor cores; and each processor core of the plurality of processor cores has a distinct associated persistent memory save area.

In example 13, a device comprises the device of any of examples 1 to 11, wherein: the processor core is one of a plurality of processor cores; and a second thread running on a second processor core of the plurality of processor cores is configured by the one or more instructions to perform operations comprising: copying second file data from a data cache for the second processor core into a persistent copy of the file that is stored in persistent memory in response to the detected failure of primary power.

In example 14, a computer-implemented method for storing data in persistent memory comprises: by a thread running on a processor core, storing file data for a file in a cache associated with the processor core; flushing, by the thread running on the processor core, the file data from the cache associated with the processor core to the persistent memory save area while retaining the file data in the cache; and copying, by the thread running on the processor core, the file data from the cache associated with the processor core into a persistent copy of the file that is stored in persistent memory.

In example 15, a computer-implemented method for storing data in persistent memory comprises the method of example 14, wherein: the storing of the file data for the file in the cache associated with the processor core is an effect of an operation to write the file data for the file into the persistent memory save area; and the operations further comprise: prior to the operation to write the file data for the file into the persistent memory save area, preventing interrupts and other threads from running on a processor core, so that only the thread runs on the processor core.

In example 16, a computer-implemented method for storing data in persistent memory comprises the method of any of examples 14 to 15, further comprising: after copying the file data into the persistent copy of the file, restoring the ability of interrupts and other threads to run on the processor core.

In example 17, a computer-implemented method for storing data in persistent memory comprises the method of any of examples 14 to 16, further comprising: after copying the file data into the persistent copy of the file, removing the file data from the cache associated with the processor core.

In example 18, a computer-implemented method for storing data in persistent memory comprises the method of any of examples 14 to 17, wherein the cache associated with the processor core is a memory buffer.

In example 19, a computer-implemented method for storing data in persistent memory comprises the method of any of examples 14 to 18, wherein: the cache associated with the processor core is a level 1 (L1) cache; and the method further comprises: flushing, by the thread running on the processor core, additional file data from an L2 cache to memory while retaining the file data in the L2 cache; and copying, by the thread running on the processor core, the file data from the L2 cache into a persistent copy of the file that is stored in persistent memory.

In example 20, a non-transitory computer-readable media stores one or more instructions, that when executed by a processor, cause the processor to perform the steps of: by a thread running on a processor core of the processor, storing file data for a file in a cache associated with the processor core; flushing, by the thread running on the processor core, the file data from the cache associated with the processor core to a persistent memory save area while retaining the file data in the cache; and copying, by the thread running on the processor core, the file data from the cache associated with the processor core into a persistent copy of the file that is stored in persistent memory.

DETAILED DESCRIPTION

Figure 1:
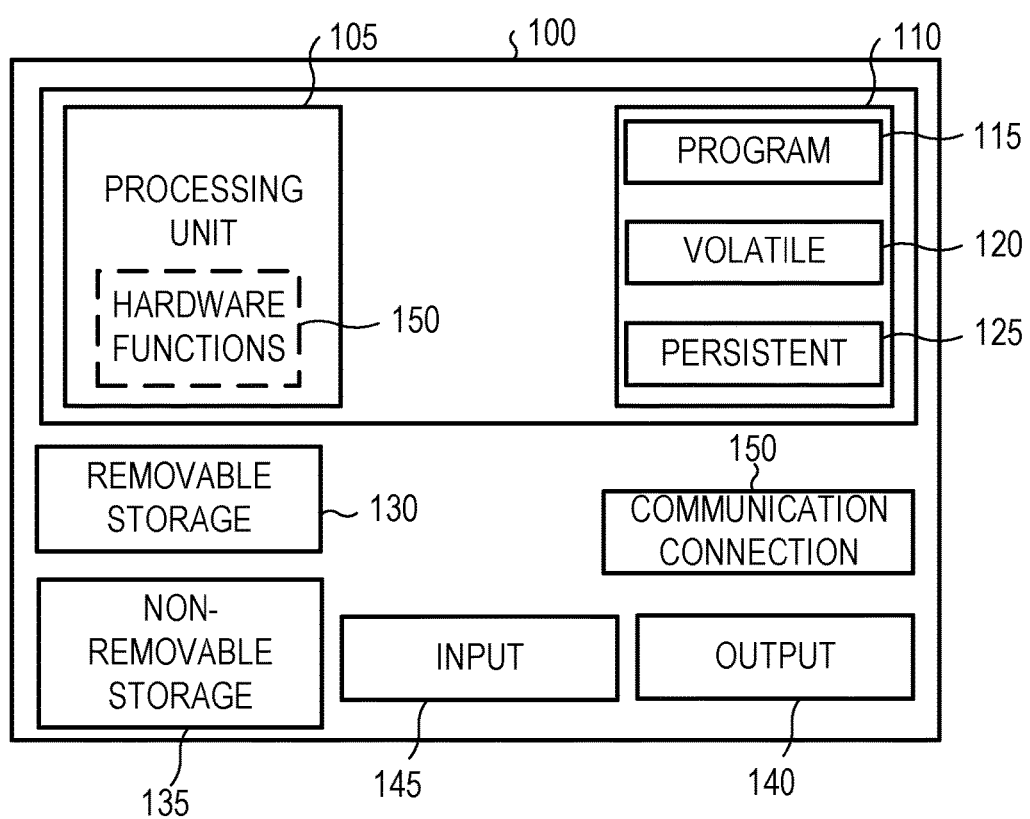
FIG. 1 is a block diagram illustrating circuitry for clients, servers, and cloud based resources for implementing algorithms and performing methods, according to example embodiments.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. The software may be executed on a digital signal processor, application-specific integrated circuit (ASIC), field programmable gate array (FPGA), microprocessor, or other type of processor operating on a computer system, such as a personal computer (PC), server, or other computer system, turning such computer system into a specifically programmed machine.

As used herein, persistent memory refers to memory that continues to store data even when power is lost. Thus, the data "persists" even in the event of a power failure or computer power down. This differentiates persistent memory from typical RAM, which only retains data while power is supplied. A memory module that includes volatile memory, a power source, and persistent memory is, as a whole, a persistent memory. In such a memory module, data may be written to faster volatile memory on request from the system and copied to slower persistent memory later by the memory module. In the event of power loss, the power source of the memory module allows the volatile memory to continue to store data while the data is copied to the persistent memory. Accordingly, as a whole, the memory module is a persistent memory even though volatile memory composes a portion of the module.

The methods and systems described herein will operate with any type of persistent memory, but in preferred embodiments, the persistent memory has an access time comparable to that of RAM and substantially faster than that of a hard disk drive (HDD) or even a solid-state drive (SSD). Examples of persistent memory include, but are not limited to, storage class memory (SCM) and non-volatile dual in-line memory modules (NVDIMM).

A consistent file update using persistent memory is performed in systems wherein the file data and the data log save area for an update of a file are shared by the same CPU pipeline and caches (such as a level one data (L1-D) cache, a level one instruction (L1-I) cache, or a level two (L2) cache). In some example embodiments, the update includes entering a code region where interrupts and other threads on the same CPU core are prevented from running. This allows a single thread to have control over cache content (e.g., L1 and L2 cache content). The thread writes file data into a persistent memory data log save area. In example embodiments, the thread flushes the data for the file from the cache to the persistent memory storage area of the file while retaining the data in the cache. In other example embodiments, the thread triggers a device (e.g., a PCI-E device) that saves the data to persistent memory by snooping the cache without altering the data in the cache.

The file data is copied from the cache into the file, and any other file metadata is updated to reflect the modification. Metadata is data maintained by the file system about the file, as distinguished from the data contents of the file itself. For example, metadata containing a checksum or size of the file may be updated by the system when the file data is updated. In some example embodiments, the code region in which interrupts and other threads are prevented from running on the CPU core is exited once the file update is complete.

In some example embodiments, the code for copying the data into the data log save area and to the target is placed into the L1-I cache for a CPU core. In these embodiments, processing one or more file updates avoids cache misses on the L1-I cache, thereby improving performance.

Devices and methods disclosed herein may decrease the total processing time or power consumed in saving data to files in persistent memory. For example, in a prior art asynchronous write, data would first be written to a save area and later copied from the save area to the file. This later copying would likely require reloading the data into the cache, thereby consuming processor cycles, power, and time. Thus, by avoiding the reloading of the data into the cache through the methods disclosed herein, processor cycles, power, and time are saved. Similarly, methods disclosed herein may reduce the amount of time that data to be saved to a file is stored in a save area. As a result, methods disclosed herein may decrease the amount of memory consumed in saving data to files in persistent memory. For example, in a prior art asynchronous write, multiple writes could be pending, each of which requires its own save area to be used in the time between the write to the save area and the copy of data from the save area to the file. In various ones of the devices and methods disclosed herein, the time between writing data to a save area and writing the data to the file is reduced in comparison to the prior art. Accordingly, the duration of use of memory by the save area is reduced, as well as the likelihood of having multiple save areas in use simultaneously.

FIG. 1 is a block diagram illustrating circuitry for implementing algorithms and performing methods, according to example embodiments. All components need not be used in various embodiments. For example, the clients, servers, and cloud based network resources may each use a different set of components or, in the case of servers, for example, larger storage devices.

One example computing device in the form of a computer 100 may include a processing unit 105, memory 110, removable storage 130, and non-removable storage 135. Although the example computing device is illustrated and described as computer 100, the computing device may be in different forms in different embodiments. For example, the computing device may instead be a smartphone, a tablet, smartwatch, or other computing device including the same or similar elements as illustrated and described with regard to FIG. 1. Devices, such as smartphones, tablets, and smartwatches, are generally collectively referred to as mobile devices or user equipment. Further, although the various data storage elements are illustrated as part of the computer 100, the storage may also or alternatively include cloud-based storage accessible via a network, such as the Internet or server based storage.

Memory 110 may include volatile memory 120 and persistent memory 125 and may store program 115. Computer 100 may include—or have access to a computing environment that includes—a variety of computer-readable media, such as volatile memory 120, persistent memory 125, removable storage 130, and non-removable storage 135. Computer storage includes RAM, read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 100 may include or have access to a computing environment that includes input 145, output 140, and a communication connection 150. Output 140 may include a display device, such as a touchscreen, that also may serve as an input device. The input 145 may include one or more of a touchscreen, touchpad, mouse, keyboard, camera, one or more device-specific buttons, one or more sensors integrated within or coupled via wired or wireless data connections to the computer 100, and other input devices. The computer may operate in a networked environment using a communication connection to connect to one or more remote computers, such as database servers. The remote computer may include a PC, server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium (e.g., the program 115 stored in the memory 110) are executable by the processing unit 105 of the computer 100. The processing unit 105 may include specialized hardware functions 150. For example, a special-purpose processor implemented in an FPGA or ASIC may perform multiple operations in response to a single instruction. In some example embodiments, dedicated hardware is used that responds directly to hardware states (e.g., input signaling lines) rather than retrieving instructions from memory.

A hard drive, CD-ROM, and RAM are some examples of articles including a non-transitory computer-readable medium such as a storage device. The terms computer-readable medium and storage device do not include carrier waves to the extent carrier waves are deemed too transitory. Computer-readable non-transitory media includes all types of computer readable media, including magnetic storage media, optical storage media, flash media and solid state storage media. It should be understood that software can be installed in and sold with a computer. Alternatively, the software can be obtained and loaded into the computer, including obtaining the software through a physical media or distribution system, including, for example, from a server owned by the software creator or from a server not owned but used by the software creator. The software can be stored on a server for distribution over the Internet, for example.

Figure 2:
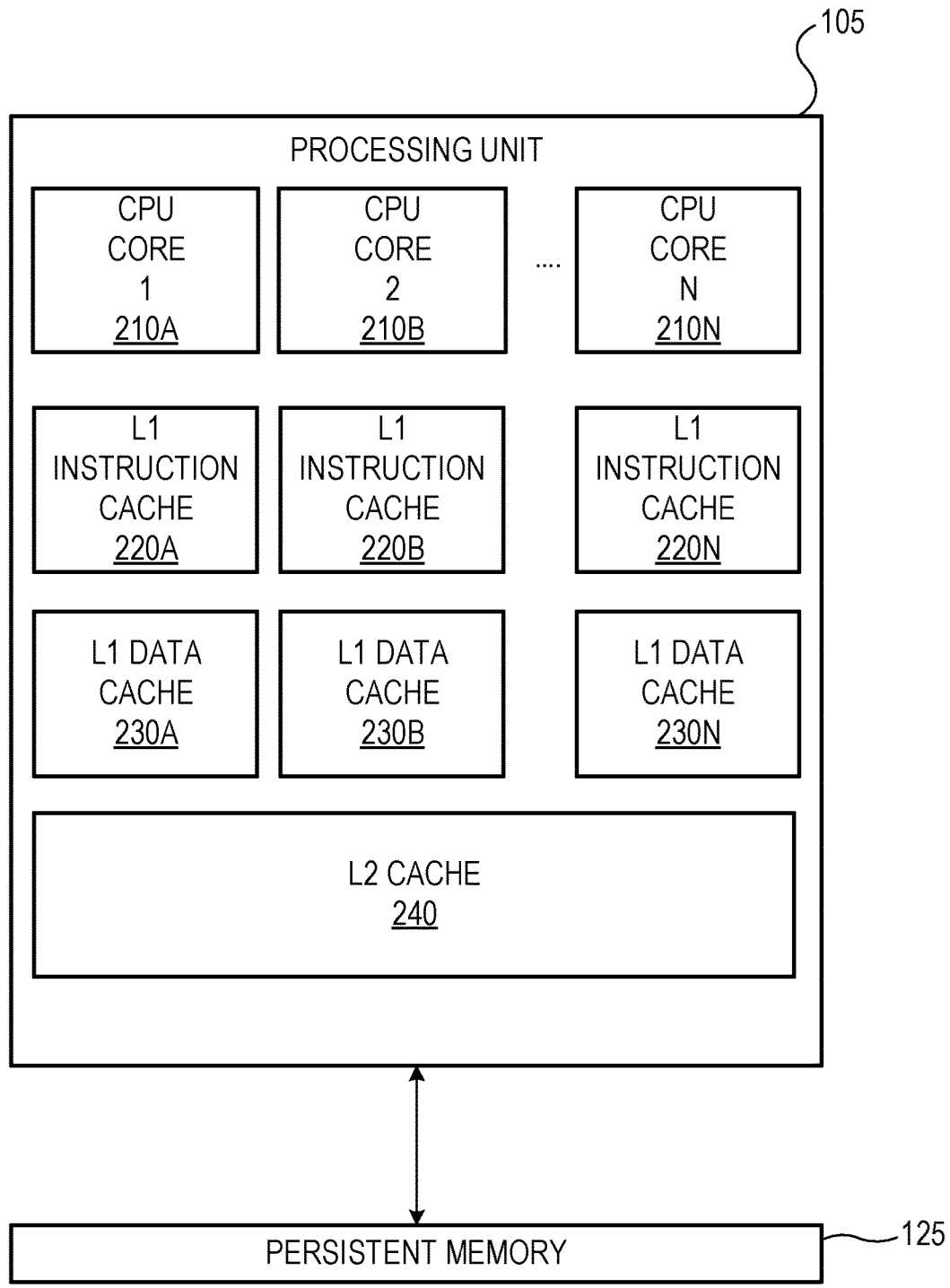
FIG. 2 is a block diagram illustrating a processing unit in communication with persistent memory for implementing algorithms and performing methods, according to example embodiments.

FIG. 2 is a block diagram illustrating a processing unit in communication with persistent memory for implementing algorithms and performing methods, according to example embodiments. The processing unit 105 includes CPU cores 210A-210N, L1 instruction caches 220A-220N, L1 data caches 230A-230N, and L2 cache 240. The CPU cores 210A-210N execute instructions using a pipeline, which allows multiple instructions to be executed simultaneously by each CPU core. The L1 cache is the lowest cache in the cache hierarchy and is closest to the CPU pipeline. The L1 cache provides the fastest cycle access time of the CPU caches and may be divided into portions divided exclusively for instructions or data, as shown in FIG. 2. Compared to the L1 cache, the L2 cache is typically larger and slower. Also, the L2 cache is frequently shared between all cores on a CPU. The processing unit 105 is in communication with the persistent memory 125 (e.g., via a high-speed data bus). In some example embodiments, a CPU core (e.g., the CPU core 210A) copies data from its L1 data cache (e.g., the L1 data cache 230A) to the persistent memory 125. The PCI-E device may also copy the data to a persistent memory on the PCI-E device itself.

Figure 3:
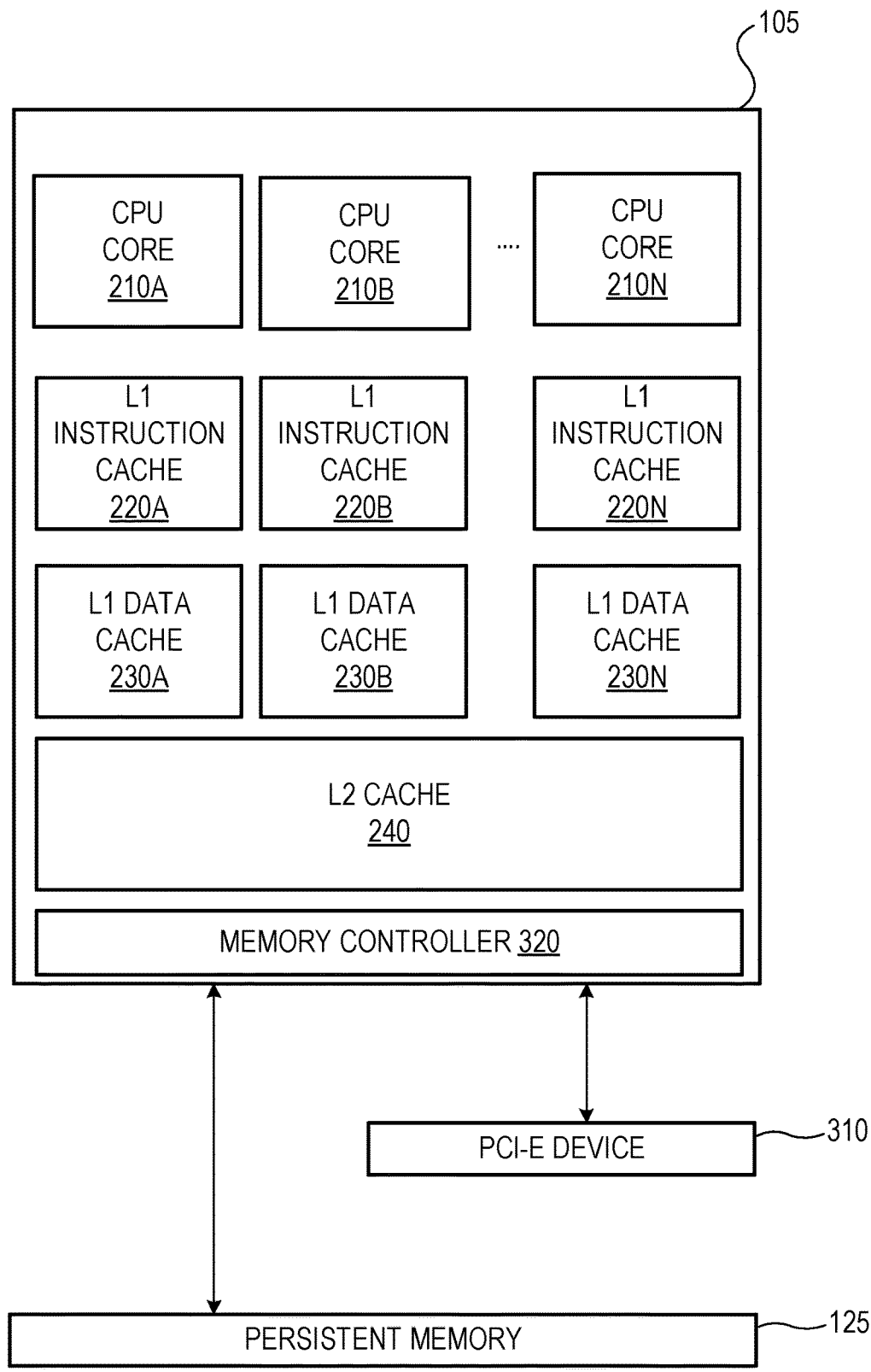
FIG. 3 is a block diagram illustrating a processing unit in communication with persistent memory via a peripheral component interconnect express (PCI-E) device for implementing algorithms and performing methods, according to example embodiments.

FIG. 3 is a block diagram illustrating a processing unit 105 in communication with persistent memory via a PCI-E device. The PCI-E device 310 is accessible by the processing unit 105, as is the persistent memory 125. In some example embodiments, the PCI-E device copies data from one or more of the caches 220A-220N, 230A-230N, or 240 to the persistent memory 125 without altering the data of the cache. For example, the PCI-E device may issue instructions to the memory controller 320 to access the data stored in the caches. The PCI-E device may also copy the data to a persistent memory on its own device board.

Figure 4:
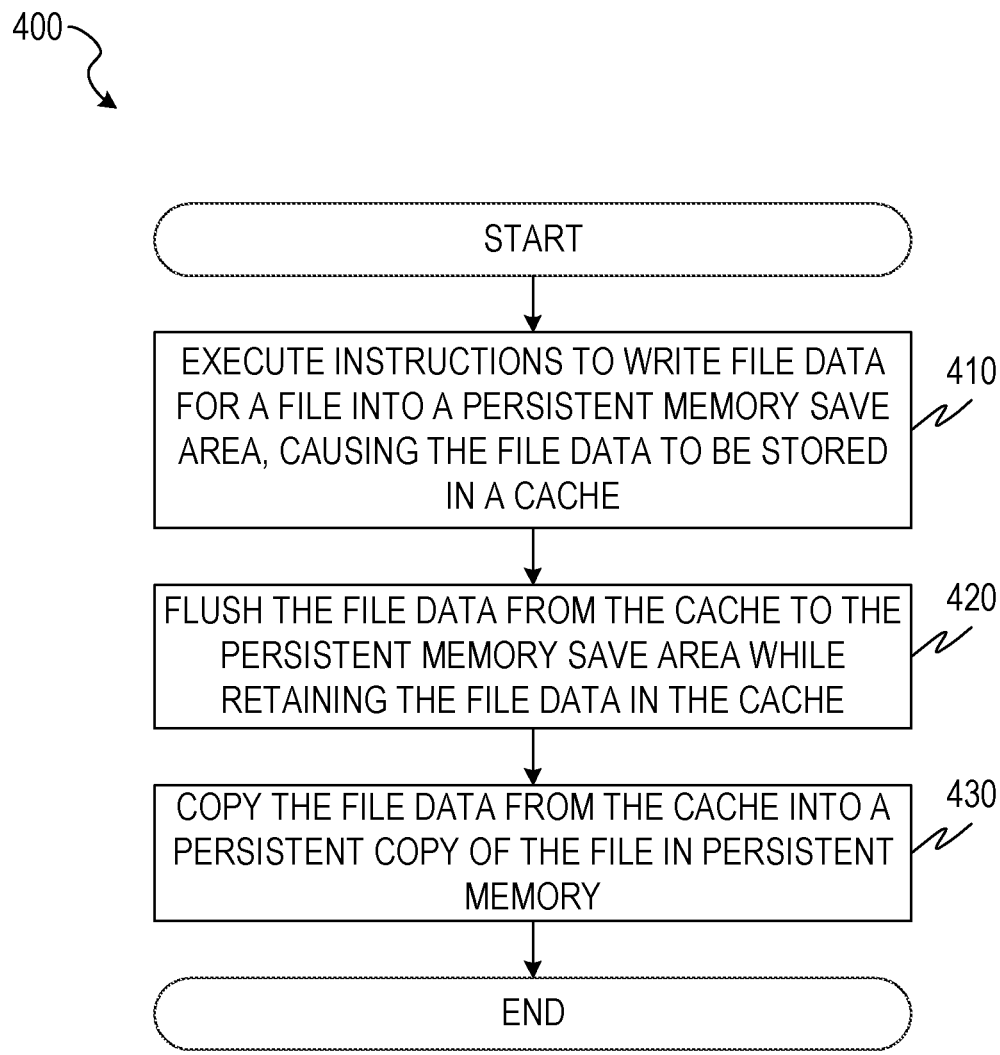
FIG. 4 is a flowchart illustration of a method of storing data in persistent memory systems, according to an example embodiment.

FIG. 4 is a flowchart illustrating a method 400 of storing data in persistent memory systems according to an example embodiment. The method 400 includes operations 410-430 and is described, by way of example and not limitation, as being performed by the components of FIGS. 1 and 2.

In operation 410, a CPU core (e.g., the CPU core 210A) executes instructions to write file data for a file into a persistent memory save area (e.g., an address range of the persistent memory 125). On modern CPUs, the instruction to write the data will cause the data to be immediately loaded into a cache, and marked to indicate that it has not yet been written to persistent memory. This caching allows the CPU to continue executing instructions without waiting for the write to persistent memory to complete. The cache may be an L1-D cache, an L2 cache, a memory buffer (such as a pipeline register), another cache, or any suitable combination thereof. For example, the file data may be larger than the L1-D cache and a portion of the file data may be stored in the L1-D cache while the remainder is stored in the L2 cache.

The persistent memory save area may be a data log located in the persistent memory 125. In some example embodiments, the data log includes the file data itself along with metadata such as the file name (or other identifier, such as an Mode), the location at which the file data is to be written, the length of the file data, a timestamp, or any suitable combination thereof.

The CPU core, in operation 420, flushes the file data from the cache to the persistent memory save area while retaining the file data in the cache. After operation 420 is complete, the file data will be stored in persistent memory. Accordingly, the write operation can be recovered in case of interruption, such as a power failure. In some example embodiments, data is written a page at a time. Page size is implementation-specific: while common page sizes are 4 KB and 8 KB, pages of 256 MB are known. When the page size is smaller than or equal to the cache size, the full page is stored in the cache. For page sizes larger than the cache size, a larger cache may be used (e.g., a larger L2 cache instead of or in addition to a smaller L1-D cache), or the page may be divided between multiple CPU cores (as described with respect to FIG. 7, below).

In operation 430, the CPU core copies the file data from the cache to a persistent copy of the file in persistent memory. The copying may be performed by executing instructions to copy data from the persistent file storage save area. Since the data was already written to the persistent file storage save area while being maintained in the cache, the instruction to read data from the persistent file storage save area for copying will instead access the data directly from the cache. Compared to the initial copy in operations 410 and 420, operation 430 executes quickly, since there is no need to reload the cache for the second copy. In some example embodiments, during or after the copying of the file data from the cache to the persistent copy of the file in persistent memory, the file data is flushed from the cache. This clearing of the file data from the cache may help to secure the file update.

Figure 5:
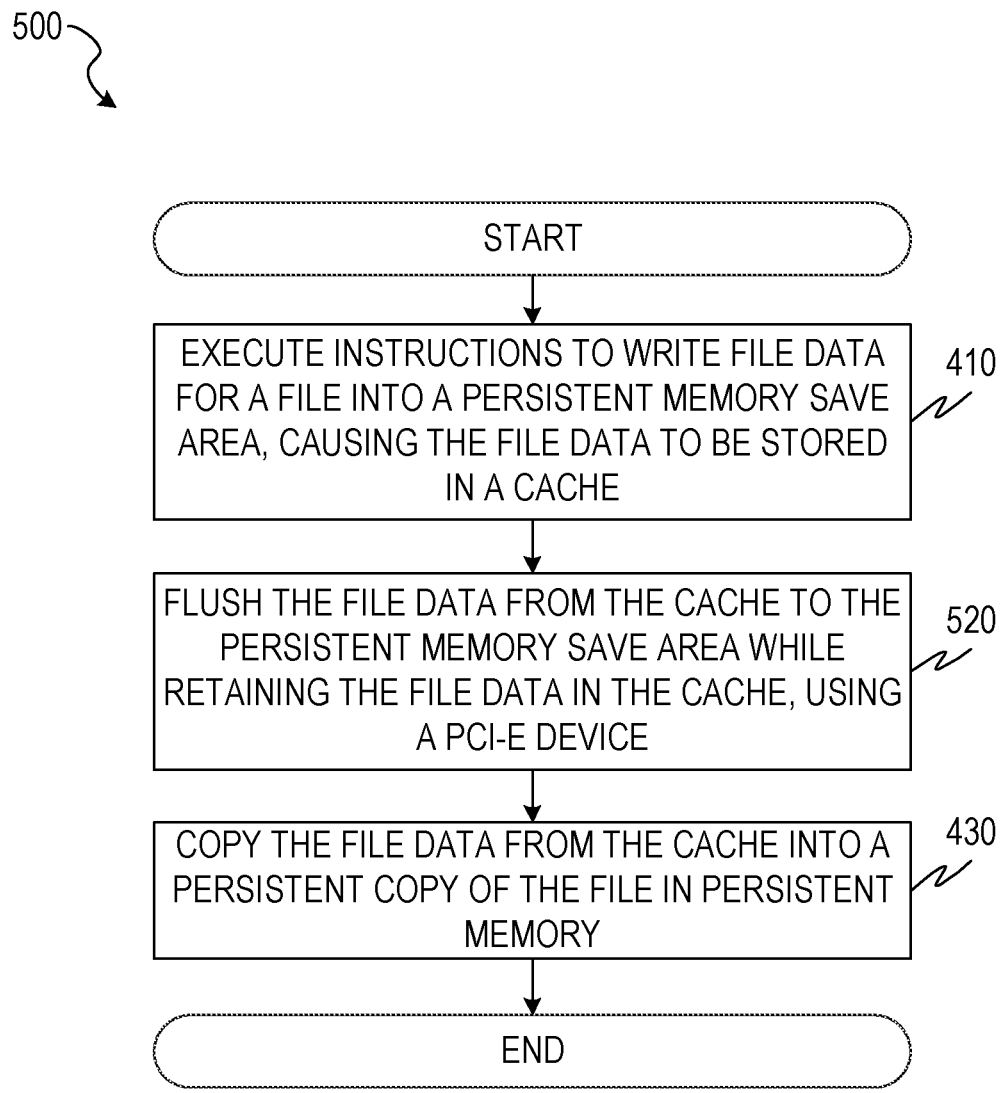
FIG. 5 is a flowchart illustration of a method of storing data in persistent memory systems, according to an example embodiment.

FIG. 5 is a flowchart illustration of a method of storing data in persistent memory systems, according to an example embodiment. The method 500 includes operations 410, 520, and 430 and is described, by way of example and not limitation, as being performed by the components of FIGS. 1 and 2. Operations 410 and 430 are described in more detail above with respect to FIG. 4.

In operation 410, a CPU core (e.g., the CPU core 210A) executes instructions to write file data for a file into a persistent memory save area (e.g., an address range of the persistent memory 125). On modern CPUs, the instruction to write the data will cause the data to be immediately loaded into a cache and marked to indicate that it has not yet been written to persistent memory.

The CPU core, in operation 520, causes a PCI-E device to read the file data from the cache and write it to the persistent memory save area while retaining the file data in the cache. After operation 520 is complete, the file data will be stored in persistent memory. Accordingly, the write operation can be recovered in case of interruption, such as a power failure.

After confirming that the PCI-E device has completed the copy of the file data to the persistent memory save area (e.g., by polling the PCI-E device or receiving an interrupt generated by the PCI-E device), the CPU core copies the file data from the cache to a persistent copy of the file in persistent memory (operation 430).

Figure 6:
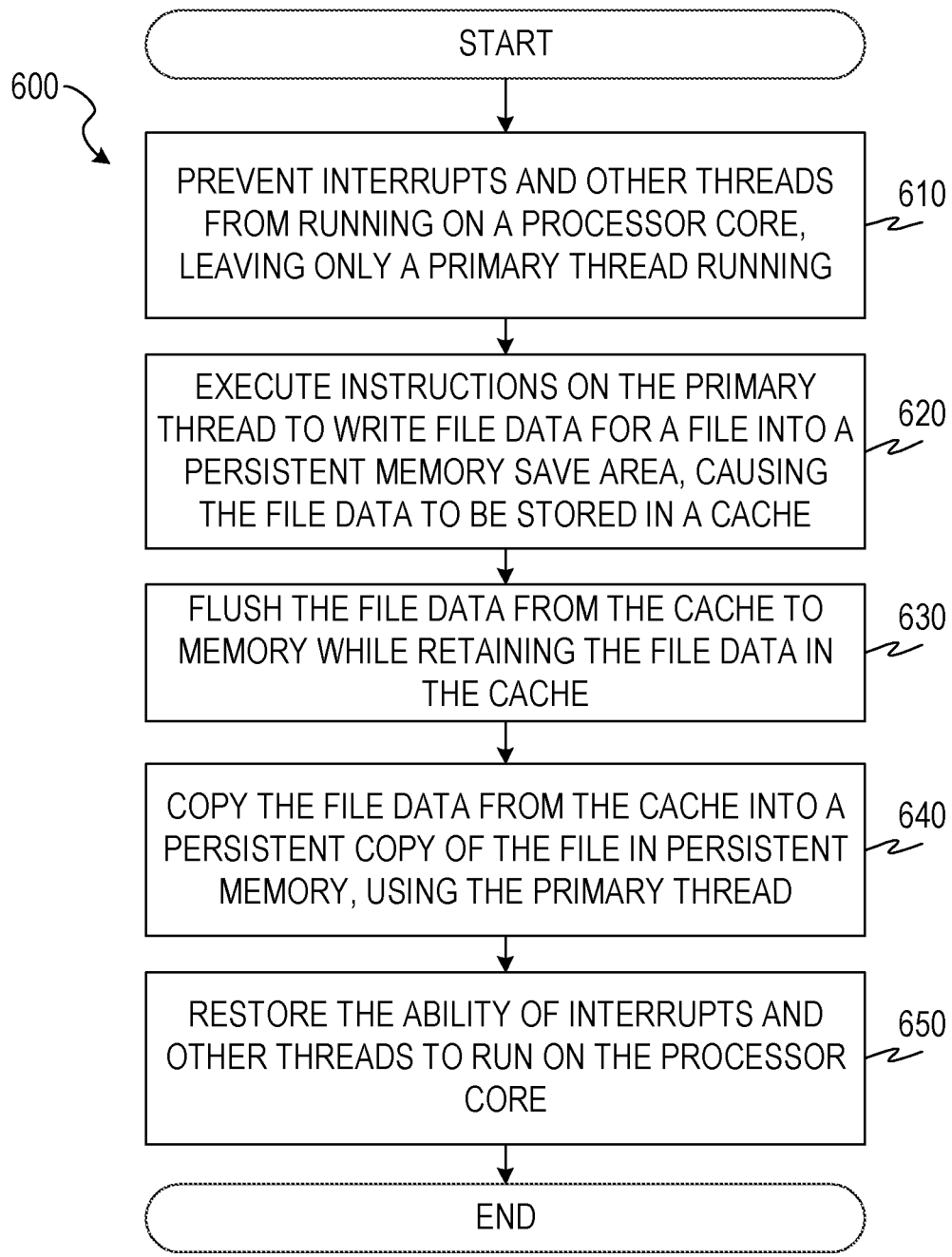
FIG. 6 is a flowchart illustration of a method of storing data in persistent memory systems, according to an example embodiment.

FIG. 6 is a flowchart illustrating a method 600 of storing data in persistent memory systems, according to an example embodiment. The method 600 includes operations 610-650 and is described, by way of example and not limitation, as being performed by the components of FIGS. 1 and 2.

In operation 610, interrupts and other threads are prevented from running on a CPU core, leaving only a primary thread running. This may be achieved by storing the existing interrupt mask for the CPU core and clearing the mask, causing the CPU core to ignore all maskable interrupts, including those that would cause the CPU core to switch from running the primary thread to running a different thread.

In some example embodiments, instructions for some or all of the operations 620-650 are loaded into the L1 instruction cache, followed by locking the L1 instruction cache. In this way, the instructions will remain in the instruction cache, avoiding delays from cache misses while fetching instructions.

In operation 620, the primary thread causes the CPU core (e.g., the CPU core 210A) to execute instructions to write file data for a file into a persistent memory save area (e.g., an address range of the persistent memory 125). As indicated above with respect to FIG. 4, on modern CPUs, the instruction to write the data will cause the data to be immediately loaded into a cache.

The CPU core, in operation 630, flushes the file data from the cache to the persistent memory save area while retaining the file data in the cache. After operation 630 is complete, the file data will be stored in persistent memory.

In operation 640, the primary thread causes the CPU core to copy the file data from the cache to a persistent copy of the file in persistent memory. Compared to the initial copy in operations 620 and 630, operation 640 executes quickly, since there is no need to reload the cache for the second copy.

After the copying is complete, the primary thread restores the ability of interrupts and other threads to run on the CPU core (operation 650). For example, the value of the interrupt mask stored in operation 610 can be restored, allowing the primary thread to be interrupted. In embodiments in which the cache is accessed only by the CPU core on which the primary thread is running, preventing interruption of the primary thread ensures that no other thread will use the portion of the cache containing the file data for the file. By comparison, the method 400, used without locking the CPU core, runs the risk that another thread will cause the file data in the cache to be removed from the cache before the file data can be used in operation 430. In that event, the file data would have to be reloaded into the cache prior to being written to the copy of the file in persistent memory. Nonetheless, since an interrupt at that particular moment is unlikely, the method 400 still provides speed benefits over prior art solutions.

Figure 7:
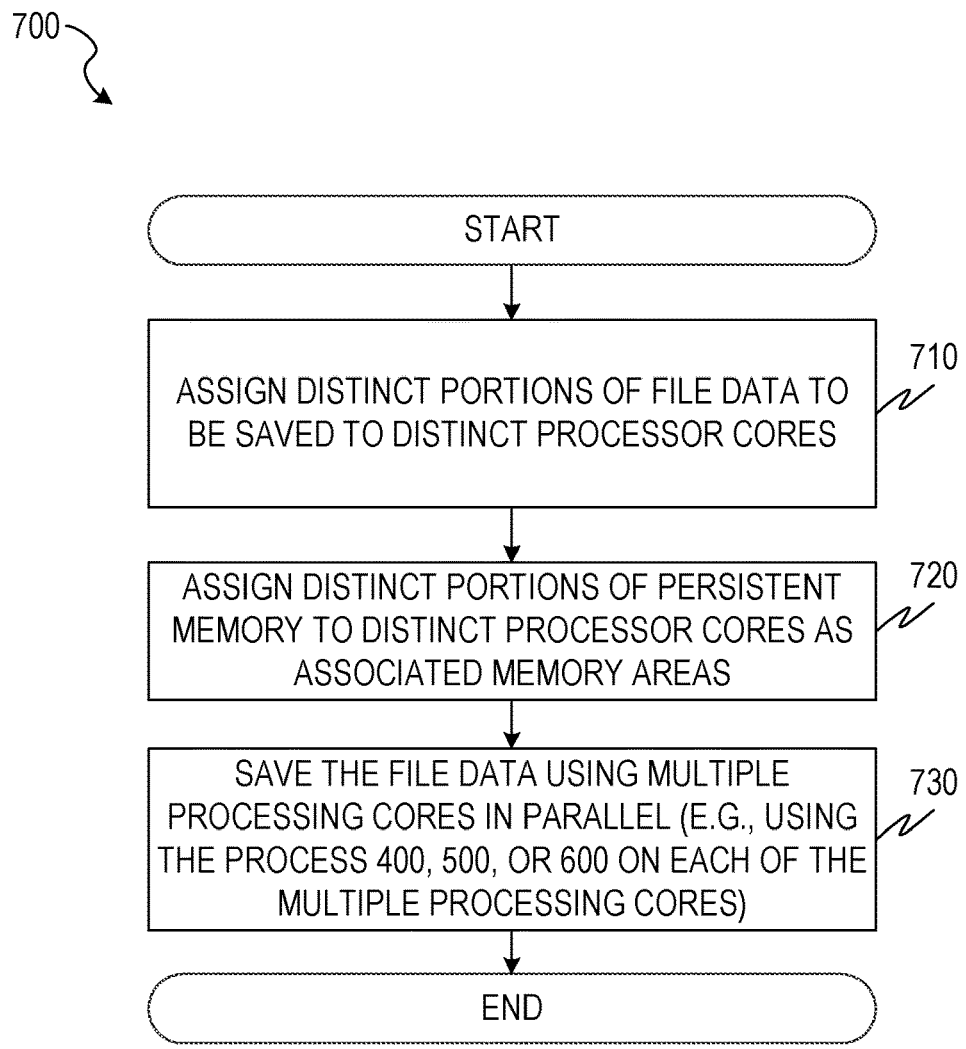
FIG. 7 is a flowchart illustration of a method of storing data in persistent memory systems, according to an example embodiment.

FIG. 7 is a flowchart illustration of a method of storing data in persistent memory systems, according to an example embodiment. The method 700 includes operations 710-730 and is described, by way of example and not limitation, as being performed by the components of FIGS. 1 and 2.

In operation 710, distinct portions of file data to be saved are assigned to distinct processor cores. For example, if 256 kilobytes of data need to be written, 32 kilobytes of data could be assigned to each of eight processor cores. Likewise, in operation 720, distinct portions of persistent memory are assigned to the distinct processor cores as associated memory areas.

The processor cores operate in parallel to save the file data (operation 730). For example, the method 400 or the method 500 may be used by each of the processor cores to copy the corresponding portion of the data. In some example embodiments, the operations of writing data to the persistent memory save area and of updating the file are synchronized so that all updates to the persistent memory save area are complete before any modification of the file occurs. This allows the entire file modification to be atomic (i.e., to either succeed or fail as a whole) even when the size of the data write is larger than the size of a cache associated with a single processor core.

As an example, suppose L1-D cache size is limited to 64K per CPU core and 640K update is desired. Ten cores may be scheduled to write 64K each to their own per-core 64K data logs (e.g., using operation 420 or operation 530). When all cores have updated their data logs, then all cores can proceed to write their data at high speed into the original file (e.g., using operation 430 or operation 540). If there is a crash during the writing of data into the original file, review of the data logs on reboot will show that all cores have saved their data in their individual data log. Accordingly, the cores will be able to restart their writes of data into the file.

Various means by which multiple independent cores can know that all cores have completed the update to each data log are well known in the art of multicore programming one example method is to have each core atomically "or" a bit depending on its core number into a common 16 bit word (for implementations with 16 or fewer cores, or a larger word for implementations with more cores) in memory and each core waits in a polling loop for all bits corresponding to the cores used to be set to 1 before proceeding. Before the cores proceed to write data to the file, the memory word is examined to see if all cores have set their bits (e.g., by a primary thread running on the CPU core 210A). The flushed word allows for detection of whether the data log save was complete or incomplete on all cores in the event of power failure or system crash.

Figure 8:
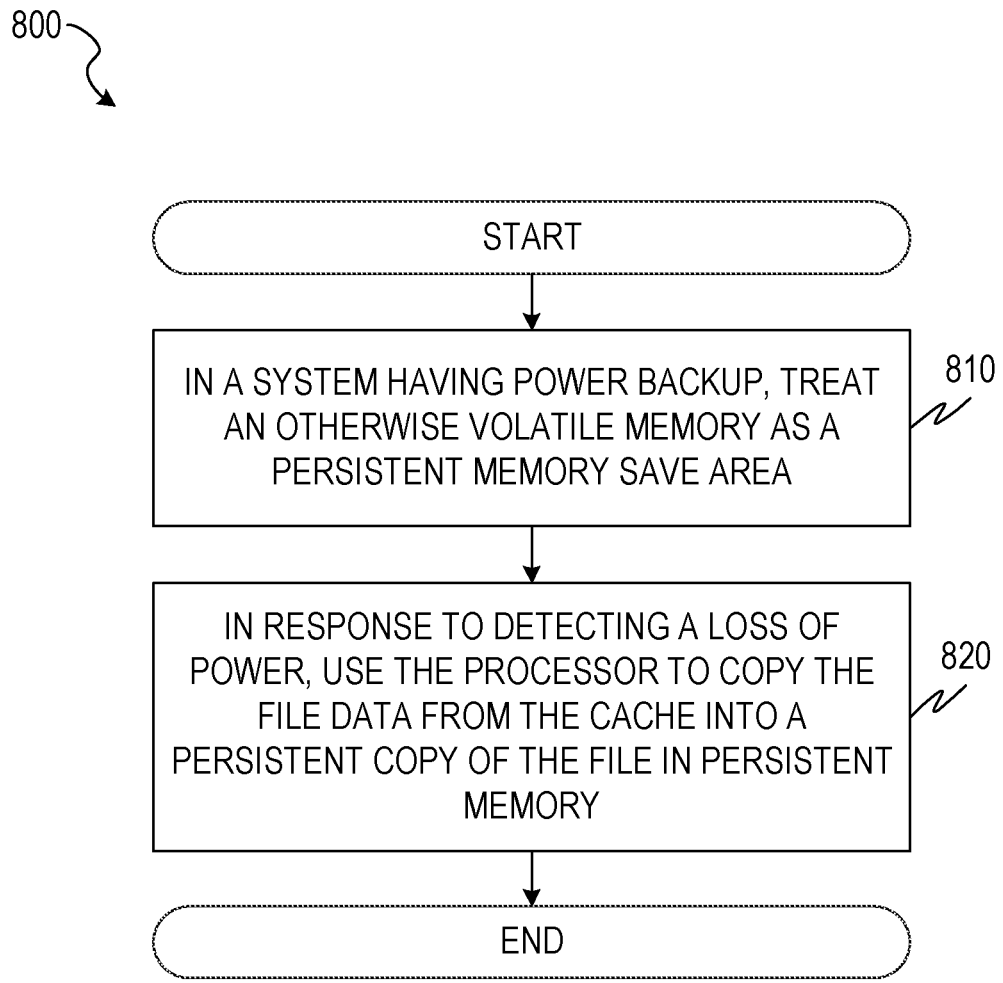
FIG. 8 is a flowchart illustration of a method of storing data in persistent memory systems, according to an example embodiment.

FIG. 8 is a flowchart illustration of a method of storing data in persistent memory systems, according to an example embodiment. The method 800 includes operations 810 and 820 and is described, by way of example and not limitation, as being performed by the components of FIGS. 1 and 2. The method 800 is performed in a system having a backup power supply for components used in transferring data from volatile memory to non-volatile memory, effectively converting the volatile memory to persistent memory. This may include providing a power backup (such as a battery or capacitor) to the CPU 105, the volatile memory 120, the memory controller 320, or other components.

In operation 810, a volatile memory of the system that is protected by a power backup is treated as a persistent memory save area. For example, during a write of data to a file, the write can be considered complete once the data is written to the volatile memory (e.g., system memory, an L1 cache, an L2 cache, a pipeline memory buffer, or any suitable combination thereof).

In operation 820, in response to detecting a loss of main power, the processor copies the file data from the volatile memory into a persistent copy of the file in persistent memory. For example, loss of main power may generate a non-maskable interrupt (NMI) that interrupts a currently-executing thread and causes code to run that is responsive to the loss of power. This code may check to see if any data stored in the volatile memory used as a persistent memory save area has not yet been written to the persistent memory. Any file data found to have not yet been written to the persistent memory is written to the persistent memory before the backup power runs out.

Devices and methods disclosed herein may decrease the total processing time or power consumed in saving data to files in persistent memory. For example, in a prior art asynchronous write, data would first be written to a save area and later copied from the save area to the file. This later copying would likely require reloading the data into the cache, thereby consuming processor cycles, power, and time. Additionally, devices and methods disclosed herein may decrease the amount of memory consumed in saving data to files in persistent memory. For example, in a prior art asynchronous write, multiple writes could be pending, each of which requires its own save area to be used in the time between the write to the save area and the copy of data from the save area to the file. In various ones of the devices and methods disclosed herein, the time between writing data to a save area and writing the data to the file is reduced in comparison to the prior art. Accordingly, the duration of use of memory by the save area is reduced, as well as the likelihood of having multiple save areas in use simultaneously.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
a non-transitory memory storage comprising one or more instructions;
a persistent memory storage device that stores a persistent first copy of a file;
a processor core in communication with the non-transitory memory storage and the persistent memory storage device;
a cache memory associated with the processor core; and
a persistent memory including a persistent memory save area;
wherein a thread running on the processor core is configured by the one or more instructions to perform operations comprising:
storing file data for a file in the cache memory;
flushing the file data from the cache memory to the persistent memory save area while retaining the file data in the cache memory to generate a second copy of the data file from the cache memory in the persistent memory save area; and
copying the file data into the persistent first copy of the file that is stored in the persistent memory storage device.

2. The device of claim 1, wherein:
the storing of the file data for the file in the cache memory is an effect of performing an operation to write the file data to the persistent first copy of the file in the persistent memory storage device; and
the operations further comprise:
prior to the performing of the operation to write the file data to the persistent first copy of the file in the persistent memory storage device, preventing interrupts and other threads from running on the processor core, so that only the thread runs on the processor core.

3. The device of claim 2, wherein the operations further comprise:
after copying the file data into the persistent first copy of the file in the persistent memory storage device, restoring the ability of interrupts and other threads to run on the processor core.

4. The device of claim 1, wherein the operations further comprise:
after copying the file data into the persistent first copy of the file in the persistent memory storage device, removing the file data from the cache memory.

5. The device of claim 1, wherein the cache memory includes a memory buffer.

6. The device of claim 1, wherein:
the cache memory includes a level 1 (L1) cache; and
the operations further comprise:
flushing, by the thread running on the processor core, additional file data of the file from a level 2 (L2) cache to memory while retaining the additional file data of the file in the L2 cache; and
copying, by the thread running on the processor core, the additional file data of the file from the L2 cache into the persistent first copy of the file that is stored in persistent memory storage device.

7. The device of claim 1, wherein the flushing of the file data from the cache memory to the persistent memory while retaining the file data in the cache memory includes copying data in the cache memory to generate the second copy of the file in the persistent memory using a peripheral component interconnect express (PCI-E) device without altering the data in the cache memory.

8. The device of claim 1, wherein the persistent memory is a storage class memory (SCM).

9. The device of claim 1, wherein the persistent memory is a non-volatile dual in-line memory module (NVDIMM).

10. The device of claim 1, wherein the operations further comprise:
copying instructions for performing the storing and flushing into an instruction cache memory for the processor core, and
locking the copied instructions.

11. The device of claim 1, further comprising:
a power backup coupled to the processor core; and
wherein the operations further comprise:
detecting a failure of primary power for the processor core; and
saving content from the cache memory in response to the detected failure of primary power.

12. The device of claim 11, wherein:
the processor core is one of a plurality of processor cores; and
a second thread running on a second processor core of the plurality of processor cores is configured by the one or more instructions to perform operations comprising:
copying second file data from a data cache memory for the second processor core into the persistent first copy of the file that is stored in the persistent memory storage device in response to the detected failure of primary power.

13. The device of claim 1, wherein:
the processor core is one of a plurality of processor cores; and
each processor core of the plurality of processor cores has a distinct associated persistent memory save area in the persistent memory.

14. A computer-implemented method for storing data in persistent memory comprising:
by a thread running on a processor core, storing file data for a file in a cache memory associated with the processor core;
flushing, by the thread running on the processor core, the file data from the cache memory to a persistent memory save area of a persistent memory while retaining the file data in the cache memory to generate a second copy of the data file from the cache memory in the persistent memory save area; and
copying, by the thread running on the processor core, the file data into a persistent first copy of the file that is stored in a persistent memory storage device.

15. The computer-implemented method of claim 14, wherein:
the storing of the file data for the file in the cache memory is an effect of an operation to write the file data for the file into the persistent memory save area; and
the method further comprises:
prior to the operation to write the file data for the file into the persistent memory save area, preventing interrupts and other threads from running on a processor core, so that only the thread runs on the processor core.

16. The computer-implemented method of claim 15, further comprising:
after copying the file data into the persistent first copy of the file in the persistent memory storage device, restoring the ability of interrupts and other threads to run on the processor core.

17. The computer-implemented method of claim 14, further comprising:
after copying the file data into the persistent first copy of the file in the persistent memory storage device, removing the file data from the cache memory.

18. The computer-implemented method of claim 14, wherein the cache memory includes a memory buffer.

19. The computer-implemented method of claim 14, wherein:
the cache memory includes a level 1 (L1) cache; and
the method further comprises:
flushing, by the thread running on the processor core, additional file data of the file from a level 2 (L2) cache to memory while retaining the additional file data of the file in the L2 cache; and
copying, by the thread running on the processor core, the additional file data of the file from the L2 cache into the persistent first copy of the file that is stored in persistent memory storage device.

20. A non-transitory computer-readable media storing one or more computer instructions, that when executed by a processor, cause the processor to perform the steps of:
by a thread running on a processor core of the processor, storing file data for a file in a cache memory associated with the processor core;
flushing, by the thread running on the processor core, the file data from the cache memory to a persistent memory save area of a persistent memory while retaining the file data in the cache memory to generate a second copy of the file data from the cache memory in the persistent memory save area; and
copying, by the thread running on the processor core, the file data into a persistent first copy of the file that is stored in a persistent memory storage device.

* * * * *